United States Patent [19]

Delmas et al.

[11] Patent Number: 5,488,873
[45] Date of Patent: Feb. 6, 1996

[54] FORCE DETECTOR AND A TACTILE SCREEN COMPRISING SUCH DETECTOR

[75] Inventors: Gilles Delmas, Epinay-sous-Senart; Guy Martin, Notseau; Michel Courdille, Sucy-en-Brie; Michel Lemonier, Vanves, all of France

[73] Assignee: U.S. Philips Corporation, New York, N.Y.

[21] Appl. No.: 343,736

[22] Filed: Nov. 14, 1994

Related U.S. Application Data

[63] Continuation of Ser. No. 150,333, Nov. 9, 1993, abandoned, which is a continuation of Ser. No. 820,188, Jan. 14, 1992, abandoned.

[30]  Foreign Application Priority Data

Jan. 22, 1991 [FR] France .................. 91 00670

[51] Int. Cl.$^6$ ......................................... G01L 1/00
[52] U.S. Cl. ...................... 73/862.627; 73/862.637
[58] Field of Search ............... 73/862.474, 862.045, 73/862.627, 862.629, 862.632, 862.637, 865.4, 865.7, 862.634, 862.59, 862.041, 862.045, 862.381, 862.627, 862.637; 178/18; 364/556

[56] References Cited

U.S. PATENT DOCUMENTS

| 2,666,262 | 1/1954 | Ruge | 73/862.632 |
|---|---|---|---|
| 3,512,595 | 5/1970 | Laimins | 73/862.634 |
| 3,741,328 | 6/1973 | Anderson et al. | 73/862.045 |
| 3,988,934 | 11/1976 | Kamphoefner et al. | 73/865.4 |
| 4,178,799 | 12/1979 | Schmieder et al. | 73/862.045 |
| 4,475,610 | 10/1984 | Schwarzschild | 73/862.629 |
| 4,550,384 | 10/1985 | Kimura | 178/18 |
| 4,558,757 | 12/1985 | Mori et al. | 178/18 |
| 5,029,219 | 7/1991 | Cox | 73/865.4 |

FOREIGN PATENT DOCUMENTS 2098739  11/1982  United Kingdom ............. 73/862.627

OTHER PUBLICATIONS

Soviet Inventions Illustrated, Derwent publications limited, week 9011, Abstract No. 082021, S02, Apr. 25, 1990 (SU–A–1483292) (MEDVED) May 30, 1989.

*Primary Examiner*—Richard Chilcot
*Assistant Examiner*—R. Biegel
*Attorney, Agent, or Firm*—Leroy Eason; Anne E. Barschall

[57]  ABSTRACT

Force detector (5) fitted with a blade carrying a strain gauge (12) and with a fixed support (10) and a mobile support (11) in which are respectively accommodated a first and second end of the said blade, the relative displacements of the two supports enabling the forces applied to the mobile support to be detected. In order to accommodate at least one of the said ends in its own support, the said support comprises a U-shaped member (13), between the two branches of which is inserted the said end bearing on slightly elastic contacts. A tactile screen is formed with the help of a plurality of such force detectors accommodated in a mobile plate (22) and a fixed frame (21). By coupling the two latter elements by means of suspensions ($24_1$, $24_2$) and elastic fasteners ($25_1$, $25_2$), the pressure forces acting on the mobile plate are, in a vertical position, decoupled from the intrinsic weight of the latter.

11 Claims, 2 Drawing Sheets

FORCE DETECTOR AND A TACTILE SCREEN COMPRISING SUCH DETECTOR

This is a continuation of application Ser. No. 08/150,333, filed on Nov. 9, 1993, now abandoned which is a continuation of Ser. No. 07/820,188, filed on Jan. 14, 1992, now abandoned.

FIELD OF THE INVENTION

The invention relates to a force detector comprising a blade carrying a strain-gauge and having a first end secured to at a fixed support and a second end secured to a mobile support, said mobile support being suitable for receiving external force application which would cause deformation of said blade.

The invention also relates to a tactile screen fitted with such detectors.

DESCRIPTION OF THE RELATED ART

A tactile screen fitted with detectors is described in U.S. Pat. No. 4,558,757. Therein, the tactile screen consists of a mobile plate joined to a fixed frame by strain gauges. When a pressing force is applied to the screen plate, for example by a finger, the resulting strain gauges detect the displacement of the screen plate. By combining the amplitudes of the displacements undergone by each of the gauges, the position of the region of the screen at which the pressing force has been applied is deduced. This is effected by associated electronic circuits. Such a tactile screen can then be used as an interface between an operator and a display device or a data processor.

The strain gauges are placed individually on small elastic plates. These are fitted at their ends with projections which serve as anchoring points. One of the ends is secured to the mobile plate and the other end to the fixed frame. The deformation takes place at the centre of the small elastic plate on which the strain gauge is located.

Such tactile screens are intended to operate under varying conditions, to be subjected to more or less delicate manipulation, and to operate over ranges of temperature and in varying positions. For widespread use they should not only be robust but also need as few adjustments as possible such as for adaptation to the conditions of use. Some disturbances relate, for example, to thermal drifts, to initial calibrations, and can in certain cases be compensated by associated electronics but with additional cost. Other disturbances may lead to overloading, which cannot be compensated, or even to breakage.

The small elastic plates which support the strain gauges in U.S. Pat. No. 4,558,757 have the particular disadvantage of being fixed rigidly both to the screen plate itself and to the fixed frame, which may lead to difficulties in using such a tactile screen with varying temperatures and positions. In the latter case, the weight of the screen plate itself disturbs the measurements when it is not perfectly horizontal and, even more so, when it is placed in a vertical position. Some of these disadvantages may also be detrimental to other uses of such detectors carrying strain gauges, for example to their use in balances.

SUMMARY TO THE INVENTION

Accordingly, it is inter alia an object of the present invention to produce a force detector in the form of a blade fitted with a strain gauge and in which the previous disadvantages have been largely eliminated. Now, according to one of its aspects, the invention solves the problem in that it is characterized in that at least one support comprises a U-shaped member for accommodating between the branches thereof accommodating the associated end of the blade between slightly elastic contact elements, which blade is generally codirected with said branches, has substantially zero clearance in a direction transverse to said branches, and wherein the contact elements of the branches cooperate with said associated end to allow low-friction motion of the blade in a direction parallel to said branches. Thus, advantageously, either the strain gauge or the supports or both, may have changes in temperature and so expand or contract, respectively. However, these changes do not complicate subsequent electronic processing. Also the effect of any warping of the fixed or mobile support is also easily overcome. The accuracy of the measurement of the deformations of the gauge is not affected by varying conditions of use.

Now, any displacement of the mobile support in either direction transverse to the blade will cause a deformation of the strain gauge that can be easily determined. However, in the direction along the blade, the strain gauge has a certain freedom with respect to the support having the contact elements. This allows the strain gauge to slide freely, which compensates for any expansion and warping. This sliding takes place with the minimum of friction by giving the contact element a relatively small surface area. This may be obtained by stops with a rounded shape, for example hemispherical. These stops may be fixed to the blade or to the U-shaped member. They may be moulded in bulk or added on, they may be held in position by gluing, soldering or any other suitable means. A preferential mode consists in moulding them in the U-shaped member, which has the advantage of perfectly defining the axis common to the two stops which come to bear on the two opposite faces of the blade. In fact, when the stops are not correctly positioned opposite each other, it is necessary to carry out corrections in the electronics which use the measurements emerging from the gauges.

The elasticity of the contacts may be provided either by the U-shaped member, or by the stops, or by sharing it between the U-shaped member and the stops. The correct amount of elasticity may be attained by amending the thickness of the stops or of the branches of the U-shaped member or on the nature of the materials. These materials may be chosen from among the following: rubber, plastics, composite materials.

A detector fitted with a blade carrying a strain gauge and accommodated in two supports according to the invention may be used individually to form a force detector, for example in a balance.

A plurality of such detectors may be used in applications wherein a mobile plate rests on several strain gauges. This is the case, for example, with the tactile screen described in U.S. Pat. No. 4,558,757. It enables the coordinates of the point of application of a force at any point on the surface to be determined. This tactile screen is mainly designed to operate with a plate placed in a substantially horizontal position. When it is put into a vertical position, the weight of the plate tends to disturb the electrical data delivered by the strain gauges. Since each gauge is acted upon differently, it follows that quite complex corrections must be made in the electronic processing. Variations in position, temperature and flatness of the plate combine to increase the complexity of carrying out the corrections to these various parameters.

These disadvantages may be avoided by using several devices according to the invention in order to support the plate of the tactile screen.

For this, the invention also relates to a tactile screen fitted with a mobile support comprising a mobile plate which receives pressing forces detected by the strain gauges and with a fixed support comprising a fixed frame, characterized by having blocking means for blocking any overall movement of the mobile plate with respect to said fixed frame, and furthermore having at least two detectors collectively detecting any localized force exerted on the plate in a direction transverse thereto. Overall movement may include translation as well as rotation. If a preferred direction of such movement is known, such as would be caused by gravitational forces, the blocking means may be executed as one or more suspensions which exclusively counteract pulling forces. In an extremely simple set-up, the suspension may be by a wire of suitable material. In another realization, the blocking means may be executed as stoppers, that exclusively resist pushing forces.

Advantageously, in a vertical position the weight of the plate is no longer carried by the strain gauge detectors but mainly by the suspension or suspensions. There is thus a decoupling between the forces of gravity which act through the weight of the plate and the pressing forces which act on the plate through a human operator or suitable member such as a stylus. It is advantageous to attach the plate to the fixed frame by at least one elastic fastener which opposes the action of the suspension means and which maintains the plate in position. The tactile screen preferentially comprises two suspensions at the top and two elastic fasteners at the bottom, whose anchoring points on the fixed frame determine a rectangle or trapezoid surrounding the mobile plate. The elastic mounting in the suspension means provides it advantageously with a great resistance to shocks and vibrations.

BRIEF DESCRIPTION OF THE FIGURES

The invention will be better understood with the help of the following figures, given as non-limiting examples, which represent.

DETAILED DESCRIPTION OF PREFERRED EMBODIMENTS

Figure 1A:
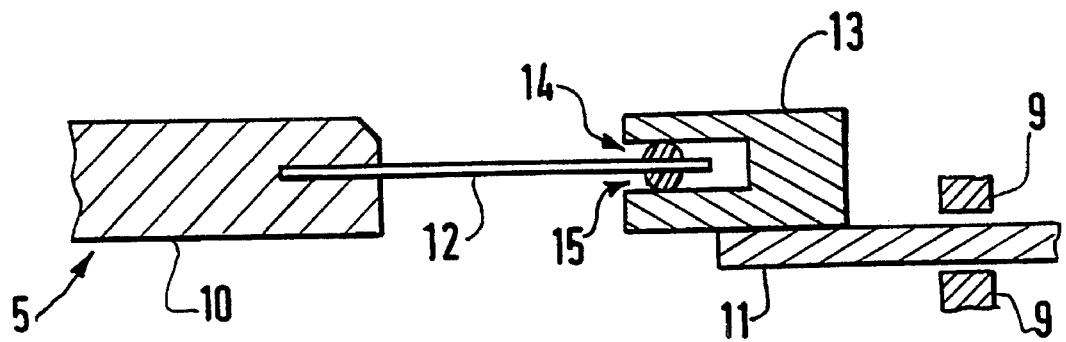
FIGS. 1A, 1B: two side views of a force detector according to the invention with stops placed respectively on the blade and on the U-shaped member.
Figure 1B:
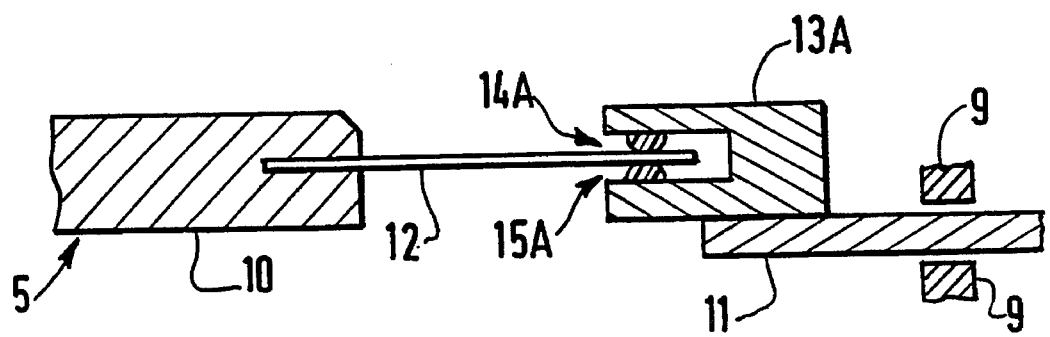

FIG. 1A represents a force detector 5 comprising a fixed support 10, a mobile support 11 and a blade 12 carrying a strain gauge not separately shown. A first end of the blade is fixed inside a slit in the fixed support 10. A second end of the blade is introduced between the branches of a U-shaped member that is fixed to the mobile support 11. Elements 9 limit the travel of the mobile support 11 to such an extent as to remain within the allowable range of deformation undergone by blade 12. Within U-shaped member 13, two stops 14, 15 are located between the second end of the blade and each of the two branches. The contacts between the stops and the U-shaped member have a slight elasticity. The thicknesses of the stops are such that the blade has almost no clearance in a direction transverse to the branches of the U-shaped member. Under the action of pressing forces applied on the mobile support and transverse to the plane of the blade, the mobile support 11 is displaced as a unit together with U-shaped member 13 and the second end of the blade 12. In a direction substantially parallel to the blade, the blade may slide with a small amount of friction in contact with the stops. In this way, any transverse force applied to the mobile support always translates to a transverse force on the blade that acts at a standard position, to wit at the position of contact elements 14, 15, irrespective of any displacement of the second end of the blade in a direction along the branches of the U-shaped member. In this way, parasitic microstresses which could diminish the accuracy of the measurement are avoided. FIG. 1A represents the case in which the stops 14, 15 are attached rigidly to the blade 12. FIG. 1B represents the case in which the stops 14A, 15A are attached rigidly to the U-shaped member 13A. In the latter case, the stops may be formed during an operation in which the U-shaped member 13A is moulded. This allows positioning the stops correctly on a common axis, which avoids adjustments that would have to be made when the two stops contact the blade at points which are not exactly opposite on each face of the blade.

Instead of being mounted on the mobile support, the U-shaped member may be mounted on the fixed support. It is possible that the two supports both have a U-shaped member. In this case, the sliding of the blade between the stops is limited by the bottom of the cavity of the U so that the blade does not escape from the stops.

Figure 1C:
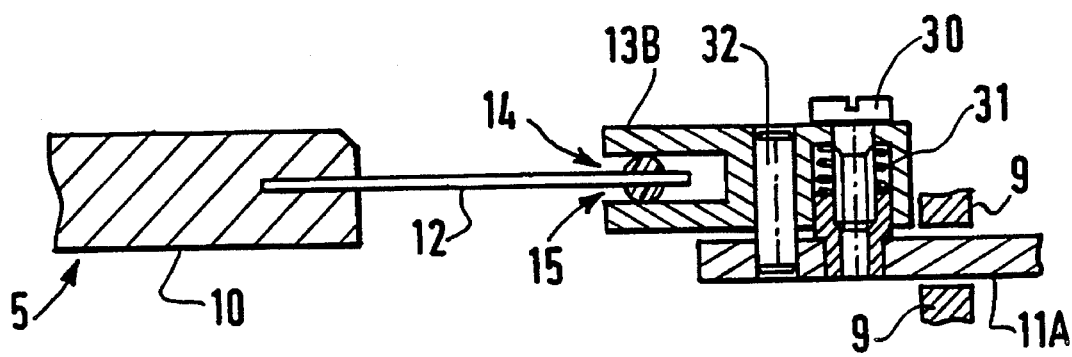
FIG. 1C: a side view of a force detector according to the invention with a mobile support fitted with an adjustment of the rest position.
Figure 2:
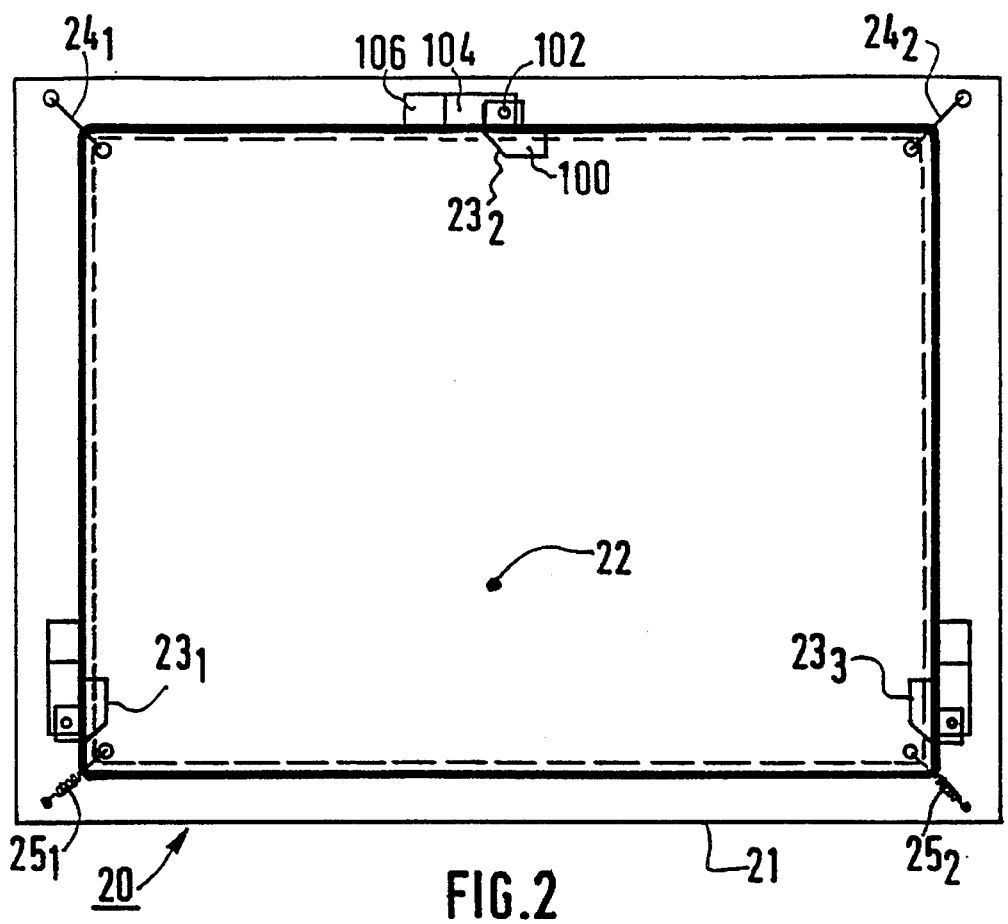
FIG. 2: a schematic view of a tactile screen fitted with three force detectors and with suspensions and elastic fasteners.

FIG. 2 represents a tactile screen 20 comprising a fixed support formed by a rigid frame 21, by a mobile support formed by a mobile plate 22 and three force detectors according to the invention $23_1$, $23_2$, $23_3$ which are secured, on the one hand, to the fixed frame 21 and, on the other hand, to the mobile plate 22. The three fixed supports of the three detectors are constituted by the fixed frame. The three mobile supports are constituted by the mobile plate. Although the details of the apparatus have not been shown as extensively as was done with respect to FIGS. 1A–1C, the following aspects are noteworthy: frame 21 has been shown in solid lines, mobile plate 22 in interrupted lines. Mobile plate 22 has been suspended from frame 21 by means of two suspension elements $24_1$ and $24_2$ that are fixed at either end to anchor points shown as little circles. The suspension elements may be in the form of wires or rods of nylon, metal, etcetera, of sufficient tensile strength. Preferably, the directions of the two are more or less perpendicular, as shown. Furthermore, detector $23_2$ has U-shaped member 100 seen from "above" with respect to FIG. 1A. The branches of the U in the figure extend as flat extensions to the upper side. The contact elements 14, 15 have been shown as a small circle. The part of U-shaped member 13 that is fixed to the mobile plate extends to the right. Blade 104 has been shown as a small rectangle. Finally the part of the fixed support wherein the blade is fixed has been shown as rectangle 106. The other force detectors $23_1$, $23_2$ have been shown in a generally similar way.

The object of suspension elements $24_1$, $24_2$ is to prevent the weight of mobile plate 22 from affecting the measurements taken by means of strain gauges of detectors $23_1$, $23_2$ and $23_3$. This also makes it possible to eliminate the effects of expansion or warping of the plate or the frame which may appear during use or mounting. The elastic fasteners $25_1$, $25_2$ located at the bottom, for example helical springs, connect the mobile plate 22 to the fixed frame 21 by being opposed to the action of the suspension elements $24_1$, $24_2$. In one particular embodiment, the tactile screen of FIG. 2 could operate for inclinations of up to about 30° with respect to the vertical.

It is possible to use four detectors placed near the corners of the plate. Difficulties in mounting might then appear due to the varying degree of flatness of the mobile plate 22 and of the fixed frame 21. Adjustment can then be obtained by having one of the four detectors constructed according to the diagram in FIG. 1C. This includes the same elements as those in FIG. 1A, but with an adjusting screw 30 in addition, which is mounted so as to act in opposition with a spring 31. This adjusting screw 30 serves to regulate the distance separating the U-shaped member 13 and the mobile plate 11. A centering pin 32 enables the U-shaped member to be indexed correctly to the mobile plate.

Figure 3A:
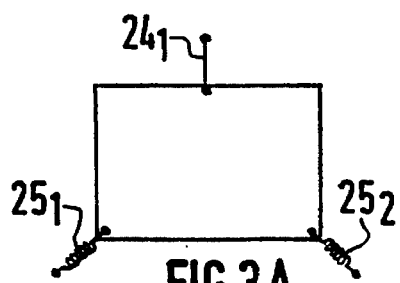
FIGS. 3A, 3B, 3C, 3D: different modes of mounting the suspensions and elastic fasteners.

FIG. 3A, 3B, 3C, 3D represent different modes of mounting the suspensions and the elastic fasteners. FIG. 3A represents the case of a central suspension $24_1$ located at the top and two elastic fasteners $25_1$, $25_2$ located at the bottom. The latter are fixed diagonally in order to keep the plate centred.

Figure 3B:
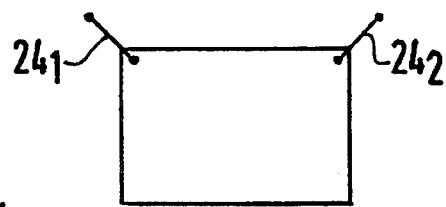

FIG. 3B represents the case of two suspensions $24_1$, $24_2$ located at the top and mounted so as to pull slightly diagonally as before. The bottom part of the plate in this case is kept in position by the force detectors themselves, like in FIG. 2, not separately shown.

Figure 3C:
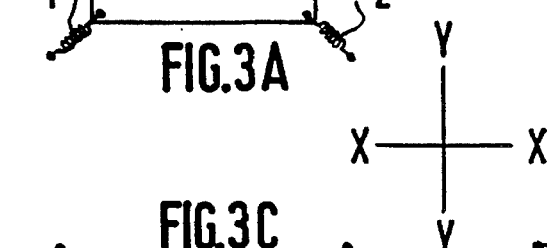

FIG. 3C represents the case of FIG. 3B to which has been added a central elastic fastener $25_1$. The positioning of the plate in its bottom part is improved.

Figure 3D:
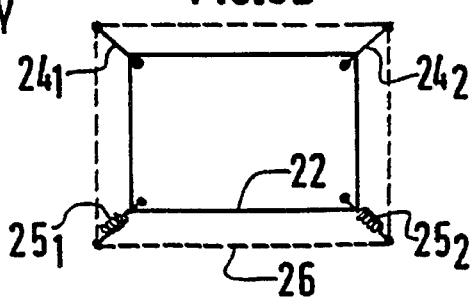

FIG. 3D represents the case of FIG. 2 with two suspensions $24_1$, $24_2$ located at the top and two elastic fasteners $25_1$, $25_2$ located at the bottom. This forms the preferred example of embodiment. The four anchoring points on the fixed frame determine a rectangle 26 which surrounds the plate 22. The plate is thus maintained correctly in the two directions XX and YY.

It is possible to reduce the plate to a long-limbed bar fitted with a force detectors placed at either its ends. The whole assembly then operates as a cursor.

What is claimed is:

1. A tactile screen comprising:
   a fixed frame;
   a mobile plate;
   at least two strain detectors for detecting forces applied to the mobile plate, each strain detector comprising a flat blade having a first end in engagement with the fixed frame and a second end in engagement with the mobile plate, the blade defining a planar surface;
   fastener means for resiliently securing the mobile plate to the fixed frame; and
   low-friction contacts between the mobile plate and the blade of each of said strain detectors.

2. The screen of claim 1 wherein the mobile plate is approximately vertically disposed and has a top edge, and the fastener means is disposed at the top edge of the mobile plate and comprises at least one member of the class consisting of a wire, a cable and a rod.

3. The screen of claim 1 wherein the mobile plate has first and second opposite edges and said fastener means comprises:

a first attaching element for securing the first edge of the mobile plate to the fixed frame; and a second attaching element for securing the second edge of the mobile plate to the fixed frame, said second attaching element comprising elastic tensile means which exerts tension in opposition to force exerted on the mobile plate by the first attaching element.

4. The screen of claim 1 wherein the mobile plate has first and second opposite edges and said fastener means comprises:

first and second attaching elements for securing the first edge of the mobile plate to the fixed frame; and first and second elastic tensile elements for securing the second edge of the mobile plate to the fixed frame;

each of the attaching elements and tensile elements being affixed to a respective anchor point on the fixed frame, which anchor points define a geometrical figure surrounding the mobile plate.

5. The screen of claim 1 wherein each strain detector further comprises:

a fixed support for cooperatively engaging the first end of said blade, the fixed support being attached to the fixed frame; and a mobile support for cooperatively engaging the second end of said blade, the mobile support being attached to the mobile plate and being responsive to application of an external force which causes deformation of the mobile plate;

at least one of the fixed support and the mobile support comprising a U-shaped member having two branches, each branch having a flat surface substantially parallel to the planar surface defined by said blade and having contact elements for supporting and maintaining constant contact with said blade;

the branches of said U-shaped member, in conjunction with said contact elements, (i) allowing substantially zero clearance, at a contact point with said blade, in a direction perpendicular to said planar surface, and (ii) allowing low-friction movement of said blade in a direction parallel to said planar surface.

6. The screen of claim 5 wherein the contact elements are random stops.

7. The screen of claim 6 wherein the stops are fixed pairwise to the branches of the U-shaped member.

8. The screen of claim 6 wherein the stops are fixed pairwise to said blade.

9. The screen of claim 6 wherein the contact elements, in conjunction with the U-shaped member, provide elasticity to the contact elements.

10. The screen of claim 6 wherein the U-shaped member is molded and during molding said stops are formed on the branches thereof.

11. The screen of claim 6 wherein at least one of said U-shaped member and said stops is made of a material from the group consisting of rubber, plastics and composite materials.

\* \* \* \* \*